United States Patent
Forsyth et al.

[11] 3,797,645
[45] Mar. 19, 1974

[54] PROTECTIVE DEVICE

[75] Inventors: Daniel H. Forsyth, Marietta, Ga.; James M. Melvin, Jr., State Line, Miss.

[73] Assignee: Lockheed Aircraft Corporation, Burbank, Calif.

[22] Filed: May 30, 1972

[21] Appl. No.: 258,083

[52] U.S. Cl.......... 206/46 H, 24/248 SA, 206/16 R, 269/238, 338/315
[51] Int. Cl... B65d 81/00, B65d 85/00, B65d 85/38
[58] Field of Search..... 206/46 H, 46 M, 16 R, 1 R; 81/303; 150/52 R; 269/238; 24/248 SA; 339/230 C, 264 R; 338/315; 29/283

[56] References Cited
UNITED STATES PATENTS

| | | | |
|---|---|---|---|
| 2,691,201 | 10/1954 | Matthews | 24/248 SA |
| 710,544 | 10/1902 | Wandell | 269/238 |
| 997,243 | 7/1911 | Daley | 269/238 |
| 1,580,083 | 4/1926 | Boadle | 269/238 |
| 2,574,306 | 11/1951 | Walker | 269/238 |
| 2,680,145 | 6/1954 | Lanfear | 81/303 |
| 2,869,606 | 1/1959 | Deitz | 150/52 R |
| 3,698,545 | 10/1972 | MacDonnell | 206/46 H |

Primary Examiner—William T. Dixson, Jr.
Attorney, Agent, or Firm—George C. Sullivan; John J. Sullivan

[57] ABSTRACT

This device is specifically designed and constructed to provide and maintain precision alignment of the mating parts of shear type transducers and thereby prevent lateral movement which causes damage to such transducers. These transducers are particularly prone to damage during their installation when torque is applied to the mounting bolts therefor.

A uniformly controlled load is applied through the device to the transducer preventing lateral movement in excess of that of its designed limits to allow for installation alignment. Due to the preciseness of alignment, the device may also be used to retain the mating parts of transducers during fabrication as well as to serve as a container during shipment and storage to prevent damage to the transducer in handling, etc.

2 Claims, 4 Drawing Figures

PROTECTIVE DEVICE

This invention relates to protective devices for fragile or sensitive elements, and more particularly to a protective device especially designed, adapted and constructed to locate and retain such an element or component in a predetermined position at all times before and during its installation in the operative assembly for which it is intended while simultaneously protecting it against breakage.

Extremely sensitive small load cells, i.e., so-called shear type transducers, are employed to measure structural deflection of metal due to shear stresses. For example, major components of aircraft such as the fuselage and the like are measured this way. To assure the integrity thereof under operational loads and conditions, the allowable displacement characteristics built into the transducer can be as little as 10 micro inches and deviations beyond such built-in limits cause damage or breakage of the part. Frequently, this damage is insidious and, therefore, goes undetected so that the transducer does not function properly and erroneous assumptions follow.

Damage to the transducer is not only likely during manufacture, shipment, storage and the general handling thereof, but also in the process of installing and removing it from the structure to which it is mounted. For such installations simple mounts have heretofore been developed which are adapted to be carried on, as an integral part, in effect, of the structure to receive a transducer and retain it in a predetermined position.

The protective device as herein proposed, therefore, not only contains the transducer for shipment and during handling but is especially designed and constructed to facilitate the connection of the transducer to the structure. Therefore, the protective device is readily removable from the assembly. Thus, the transducer is maintained at all times in a predetermined, relatively immovable position first by the protector alone and then by the mounts alone after transfer of the transducer thereto from the protector. When removed or disconnected from the transducer, this protective device is reusable an unlimited number of times, if desired.

More specifically, the present protective device comprises a pair of clamping plates having precisely aligned, complementary jaws to receive and engage each lug or ear of the transducer and thereby locate it in a predetermined position. Thus disposed, the ears of the transducer are brought into alignment with the mounts of the structure on which it is to be installed and secured, as by bolting, thereto. With the transducer now in place on and carried by the structure as an integral part thereof, the clamping plates may be released and the protective device removed.

With the above and other objects in view as will be apparent, this invention consists in the construction, combination and arrangement of parts all as hereinafter more clearly described, claimed and illustrated in the accompanying drawings wherein:

Figure 3:
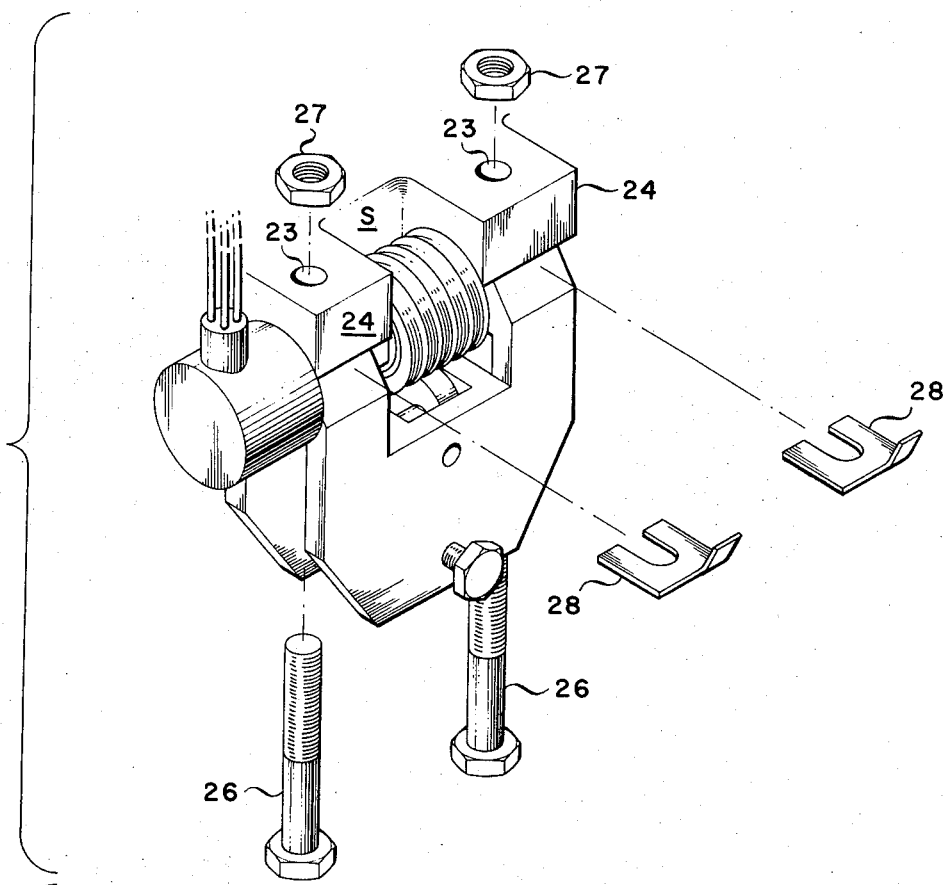
Figure 4:
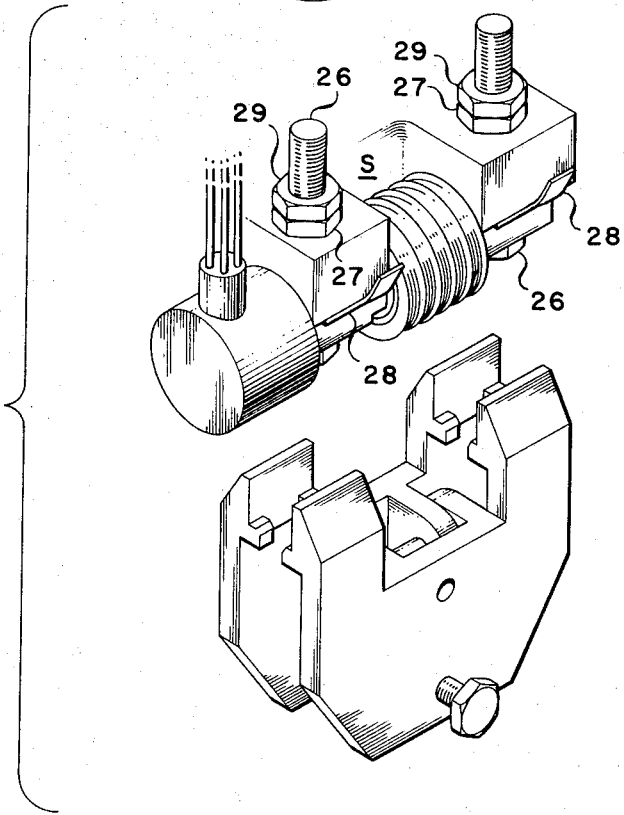

FIG. 3 is a similar view showing the transducer and positioning and retaining assembly after the protective cover has been removed located adjacent the mounts carried by the structure on which the transducer is to be mounted to show how the transfer of the transducer from the positioning and retaining assembly to the mounts is made; and FIG. 4 is a similar view of the protective positioning and retaining assembly as it is removed from the transducer after the transducer has been completely secured to the mounts of the structure.

Referring more particularly to the drawings, 10 designates the transducer positioning and retaining assembly of the protective device which consists of a pair of identical plates 11 and 12. Each of these plates 11 and 12 is formed with integral protections or clevises 13 extending from one face thereof and spaced one from the other. A transverse hole pierces each clevis 13 to accommodate a bolt or pin 14 whereby the plates 11 and 12 may be pivotally interconnected to each other when the clevises 13 of the plates 11 and 12 are disposed adjacent one another with their holes aligned. Thus connected, the plates 11 and 12 are free of rotate about the pin 14 to move their opposite corresponding ends to and from each other.

Adjacent one end of each plate 11 and 12 is a marginal, gripping surface 15 which is defined inwardly of the plate 11 and 12 by a shoulder 16. The gripping surfaces 15 of the plates 11 and 12 as well as the adjacent surfaces of the associated shoulders 16 align one with the other so that when the plates 11 and 12 are assembled as above described they coact with each other to receive and hold the flat end portions 17 of a transducer 18.

The clamping pressure of the gripping surfaces 15 of the plates 11 and 12 is regulated and controlled by a lock bolt 19 which pierces one of the plates, for example plate 12, passing through a hole provided therein so that the end of the lock bolt 19 strikes the adjacent face of the other plate 11 causing the relative rotation of the plates 11 and 12 about their pivot pin 14. When the lock bolt 19 is loosened, the gripping pressure is released and the positioning and retaining assembly 10 may be removed from the transducer 18 after the transducer has been installed on a structure S, as will be described.

The portions of the plates 11 and 12 intermediate the extremities of their gripping surfaces 15 are cut out or recessed as at 20 to accommodate the central portion of the transducer 18 in which the contact elements are located. The design and construction of the trans18 is such that upon deflection thereof the elements within the central portion thereof covered and protected by a flexible boot or bellows 21 are made to react to compression and tension when the lugs 17 are displaced from each other to establish signals accordingly which are transmitted through conductors 18' to a remote readout or other appropriate station (not shown).

It is noted that each end of the transducer 18 is pierced by a vertical hole 22 which is designed and adapted to mate with similar holes 23 provided in mounts 24 secured to and projecting from the structure S.

Figure 1:
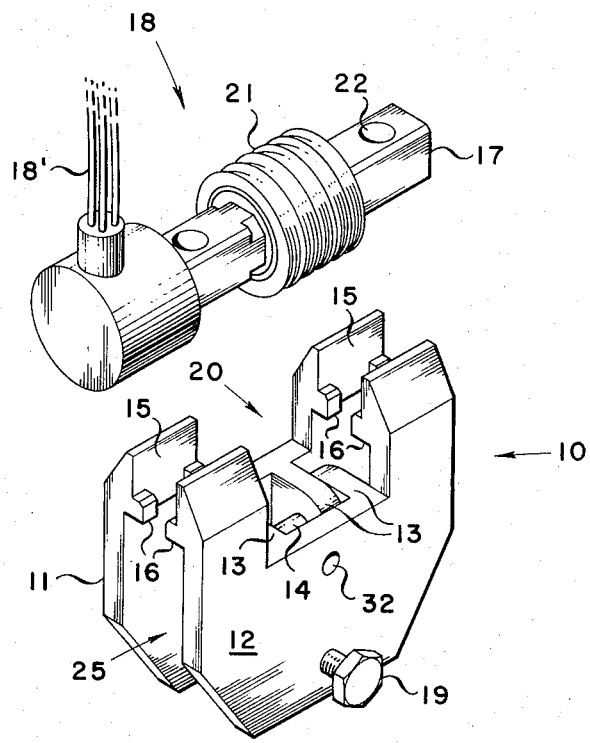
FIG. 1 is a perspective view of the clamping plates constituting the transducer positioning and retaining assembly of a protective device within the purview of this invention with a shear type transducer associated therewith to indicate the manner of assembly thereof.
Figure 2:
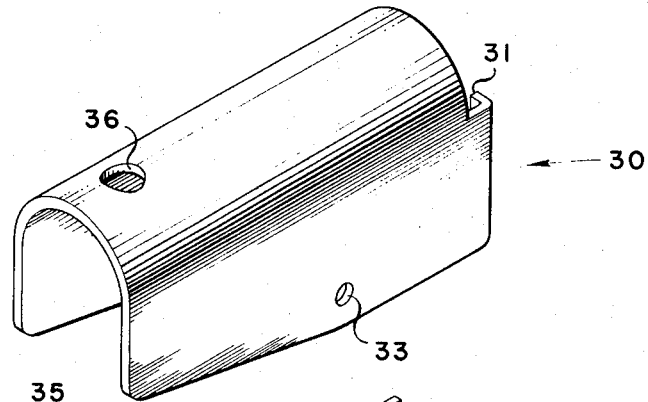
FIG. 2 is a similar view showing the transducer as it is positioned and retained within the protective device with a cover associated therewith to protect the transducer during shipment, storage, etc., to indicate the manner of assembly thereof.
Figure 2:
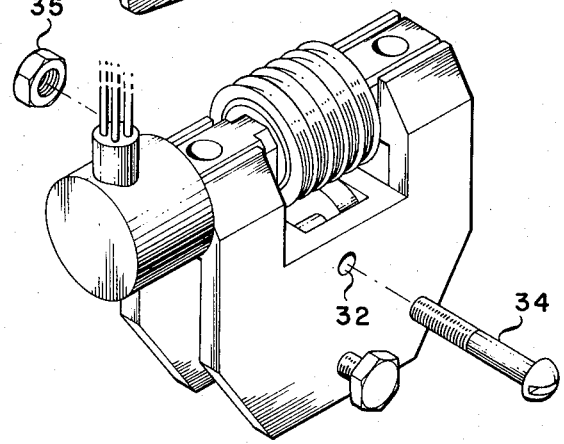

When the positioning and retaining assembly 10 with transducer 18 therein (as illustrated in FIGS. 2 and 3) is located adjacent the mounts 24 the space 25 between the plates 11 and 12 allows for the passage of a bolt 26 through the aligned holes 22 and 23 in each end of the transducer 18 and the adjacent mounts 24. The transducer 18 is thereby secured to the structure S by the assembly of a nut 27 on the outer end of each bolt 26.

In order to compensate for any discrepancies between the faying surfaces of the mounts 24 and the transducer ends 17 one or more shims 28 may be employed therebetween to assure the proper attitude of the transducer 18 in its ultimate installation. Also, to assure the retention of the transducer 18 in this position and to the mounts 24 a lock nut 29 may be employed.

With the transducer 18 thus installed, the positioning and retaining element 10 may now be removed simply by loosening the bolt 19. The clamping pressure of the surfaces 15 is thereby released as the plates 11 and 12 are rotated about their pin 14. The assembly 10 is thereafter reusable any number of times.

As an added feature further protection is afforded the transducer 18 during handling as when being manufactured and/or shipped by means of and through a protective cover 29 (FIG. 2). Preferably this cover 30 is fabricated of sheet metal and is formed like a hood so as to wrap around and enclose the transducer 18 when held by the assembly 10. At one end it is formed or otherwise provided with a flange 31 to properly locate it in position relative to the transducer 18 and align transverse holes 32 piecing each plate 11 and 12 with similar holes 33 in opposite sides of the cover 30. Thus disposed, a bolt 34 passing through the several aligned holes secures the cover 30 to the assembly 10 when a nut 35 is tightened on the end of the bolt 34 to act in opposition to the bolt head. An appropriate opening as at 36 is provided in the cover 30 to permit the passage of the transducer conductors 18'.

While the protective device herein proposed has been described in terms of the presently preferred embodiment, other forms will be equally acceptable or perhaps preferred depending largely upon the particular installation. Essentially, the device must locate and retain the shear type transducer against axial deflection in excess of that built-in allowance of its highly sensitive contacts. It must provide means to assure this at all times subsequent to fabrication of the transducer until installed in the assembly for which it is intended. Thereafter, its removal should be effected readily and without disturbing such installation.

As indicated above, this protective device may even be employed during fabrication of the transducer. In such case, it would locate and retain the transducer contacts prior to and during their connection and before covered by the bellows 21.

What is claimed is:

1. A protective device for a shear type transducer formed with rigid, flat end portions and a flexible medial portion containing contact elements capable of predetermined limited displacement to measure structural deflection of metal due to shear stresses when mounted by said end lugs to said metal comprising:

a pair of plates pivotally connected one to the other, said plates defining a pair of aligned jaws adjacent their opposite ends adapted to receive and engage said transducer end portions and a cut out between said jaws to accommodate said transducer medial portion, whereby said plates are relatively rotatable about their pivotal connection aforesaid adjusting the clamping pressure uniformly applied by said jaws on said transducer end portions without contact with said medial portion;

an adjustable force-applying actuator operative between said plates to rotate them about said pivotal connection; and a removable cover formed by a bowed sheet secured to opposite faces of said plates and overlying said jaws, said cutout and said medial portion of the transducer when retained therein, one end of said sheet being flanged to contact one end of said plates to establish its relative position thereto and to said transducer.

2. The device of claim 1 wherein said plates are substantially identical and said pivotal connection includes a pair of spaced clevises projecting from each of said plates toward the other plate, each clevis being pierced by a transverse hole, and a pin passing through said several holes when aligned; and said actuator includes a bolt threadably mounted transversely through one of said plates on the opposite side of said clevises with respect to said jaws adapted to contact the adjacent face of the other of said plates.

* * * * *